United States Patent
Yang et al.

(10) Patent No.: US 8,655,534 B2
(45) Date of Patent: Feb. 18, 2014

(54) ASSISTING FORCE CONTROL DEVICE FOR BICYCLE

(75) Inventors: Hung-Ching Yang, Yangmei (TW); Chang-Yuan Lin, Yangmei (TW); Wei-Feng Yen, Yangmei (TW); Shi-Chuan Cheng, Yangmei (TW); Kuo-Wei Huang, Yangmei (TW); Yun-Sheng Sung, Yangmei (TW)

(73) Assignee: China Motor Corporation, Taipei (TW)

( * ) Notice: Subject to any disclaimer, the term of this patent is extended or adjusted under 35 U.S.C. 154(b) by 81 days.

(21) Appl. No.: 13/537,120

(22) Filed: Jun. 29, 2012

(65) Prior Publication Data

US 2013/0006463 A1    Jan. 3, 2013

(30) Foreign Application Priority Data

Jun. 30, 2011 (TW) ............................... 100212013

(51) Int. Cl.
*B60L 9/00* (2006.01)
(52) U.S. Cl.
USPC ............................................. 701/22; 440/1

(58) Field of Classification Search
USPC ..................... 701/22, 93; 440/1; 180/65.31; 188/24.11, 156
See application file for complete search history.

(56) References Cited

U.S. PATENT DOCUMENTS

| 2008/0132127 A1* | 6/2008 | Jansen ............................. 440/1 |
| 2010/0252345 A1* | 10/2010 | Hoshino ..................... 180/65.31 |
| 2012/0241264 A1* | 9/2012 | Hosaka et al. ................ 188/156 |

\* cited by examiner

*Primary Examiner* — Mary Cheung
(74) *Attorney, Agent, or Firm* — Duane Morris LLP

(57) ABSTRACT

An assisting force control device for use in a bicycle with an electric motor and a crankshaft includes a driving member coupled co-rotatably to the crankshaft, a strain sensor disposed on the driving member, a torque calculation unit coupled to the strain sensor for calculating and outputting a torque signal, a rotational speed detection unit mounted on the crankshaft for outputting a rotational speed detecting signal, and a control unit. The control unit includes a receiving module for receiving the rotational speed detecting signal and the torque signal, and a processing module coupled to the receiving module for generating a force control signal to control the electric motor accordingly.

11 Claims, 4 Drawing Sheets

US 8,655,534 B2

ASSISTING FORCE CONTROL DEVICE FOR BICYCLE

CROSS-REFERENCE TO RELATED APPLICATION

This application claims priority to Taiwanese Application No. 100212013, filed on Jun. 30, 2011.

BACKGROUND OF THE INVENTION

1. Field of the Invention

The invention relates to an assisting force control device, and more particularly to an assisting force control device using a rotational speed detecting signal and a torque signal to control the assisting force for a bicycle.

2. Description of the Related Art

A conventional electric bicycle, which is disclosed in Taiwanese utility model No. M326504, includes a treading force sensing module disposed on a pedal member to sense the treading force by direct contact with rider's feet. The bicycle uses a sensed signal to control rotation of a driving motor, so as to provide force to assist driving of the bicycle, and to reduce the rider's driving loading.

Since the treading power provided by the rider is related to the treading force and speed, an accurate representation of the rider's effort is not obtained by measuring only the treading force, so that the electric bicycle cannot provide a comfortable ride to the rider under different road conditions, such as uphill, downhill, and flat terrain.

SUMMARY OF THE INVENTION

Therefore, an object of the present invention is to provide an assisting force control device that is for use in a bicycle including an electric motor and that is capable of providing an appropriate response to a force from a user.

According to the present invention, an assisting force control device comprises:

a driving member to be coupled co-rotatably to a crankshaft of the bicycle;

a strain sensor disposed on the driving member, and operable to output a response signal corresponding to a deformation amount of the driving member;

a torque calculation unit coupled to the strain sensor for calculating and outputting a torque signal according to the response signal;

a rotational speed detection unit to be mounted on the crankshaft and operable to output a rotational speed detecting signal based on a rotational speed of the crankshaft; and a control unit including
  a receiving module for receiving the rotational speed detecting signal and the torque signal from the rotational speed detection unit and the torque calculation unit, respectively, and
  a processing module coupled to the receiving module for generating a force control signal to control the electric motor according to the rotational speed detecting signal and the torque signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
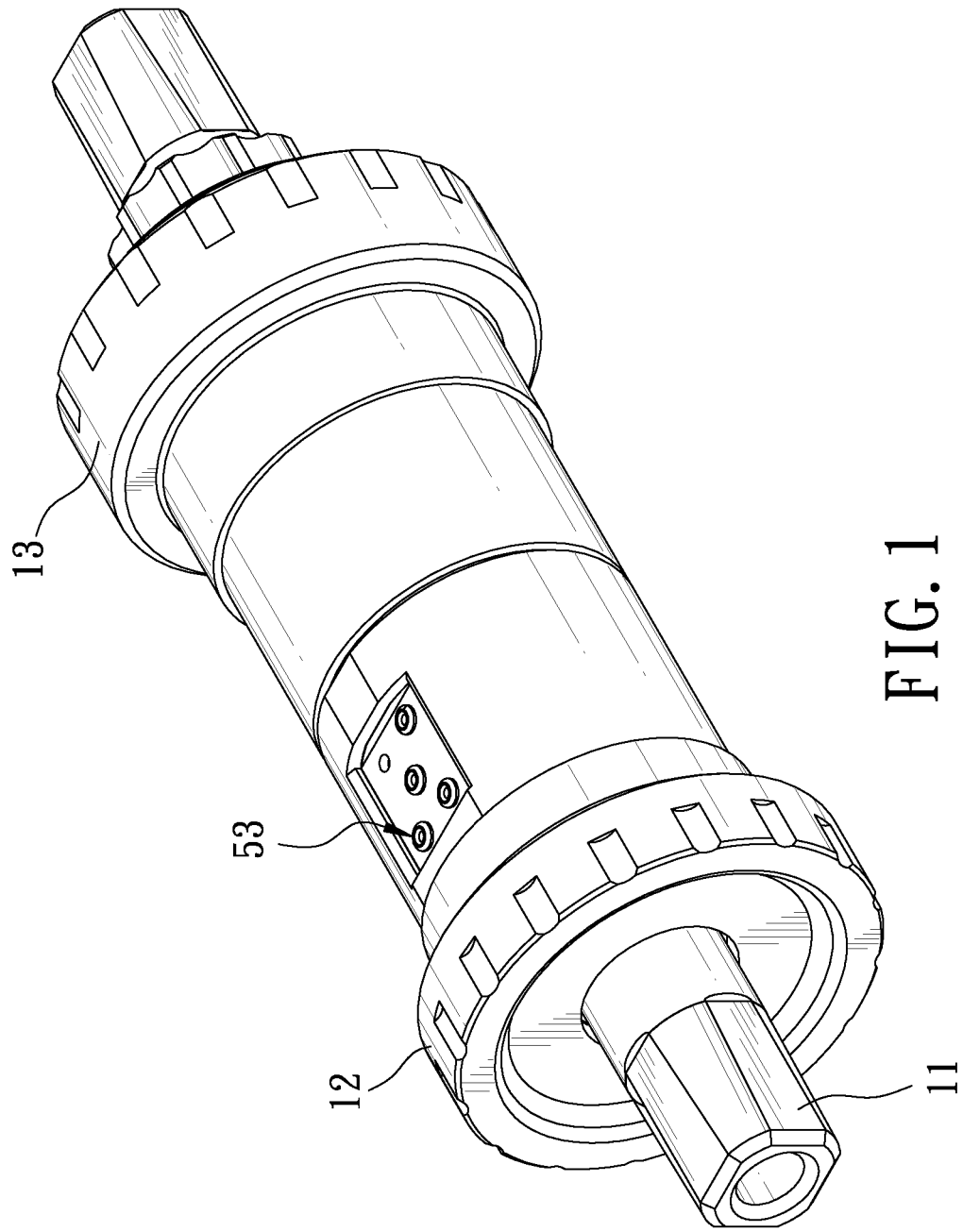
FIG. 1 is an assembled perspective view showing a preferred embodiment of the assisting force control device for a bicycle according to the present invention.
Figure 2:
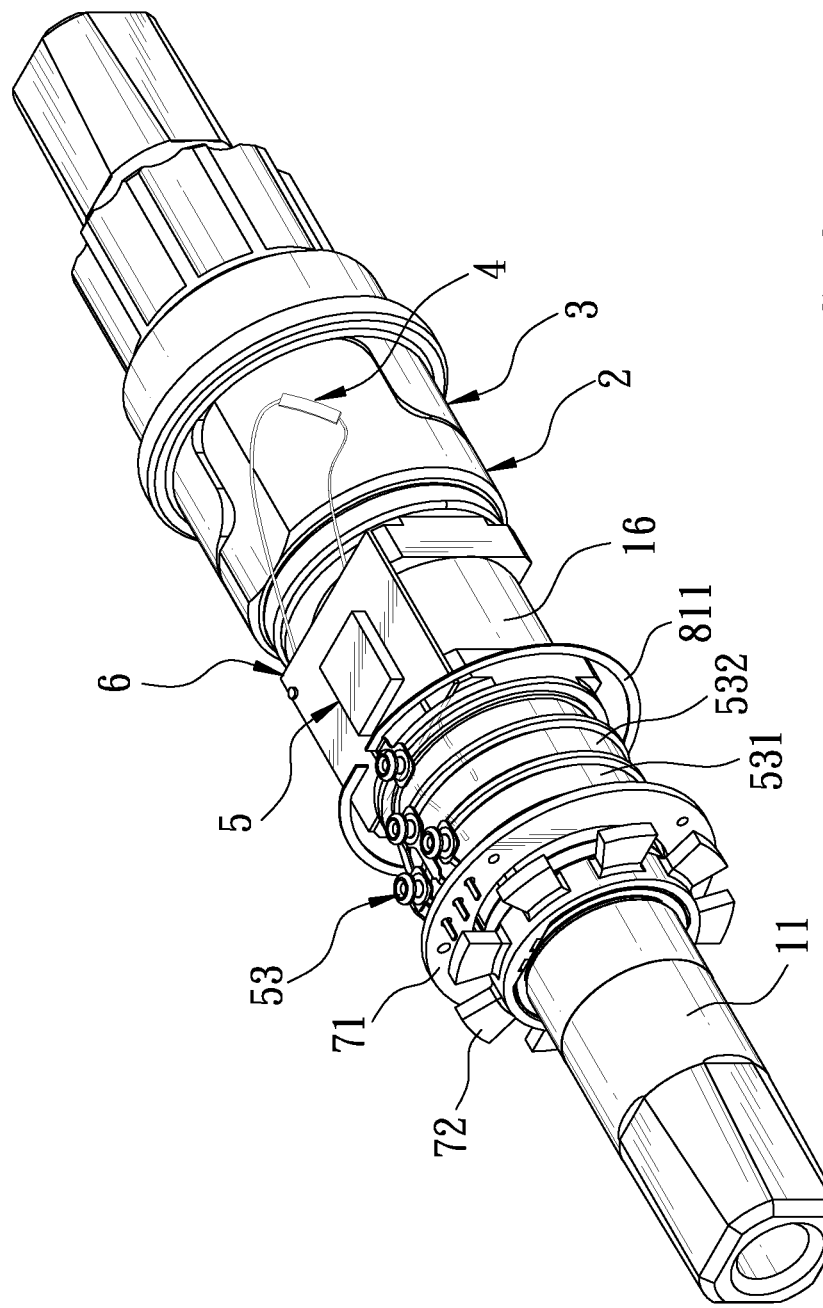
FIG. 2 is a fragmentary perspective view of the preferred embodiment.
Figure 3:
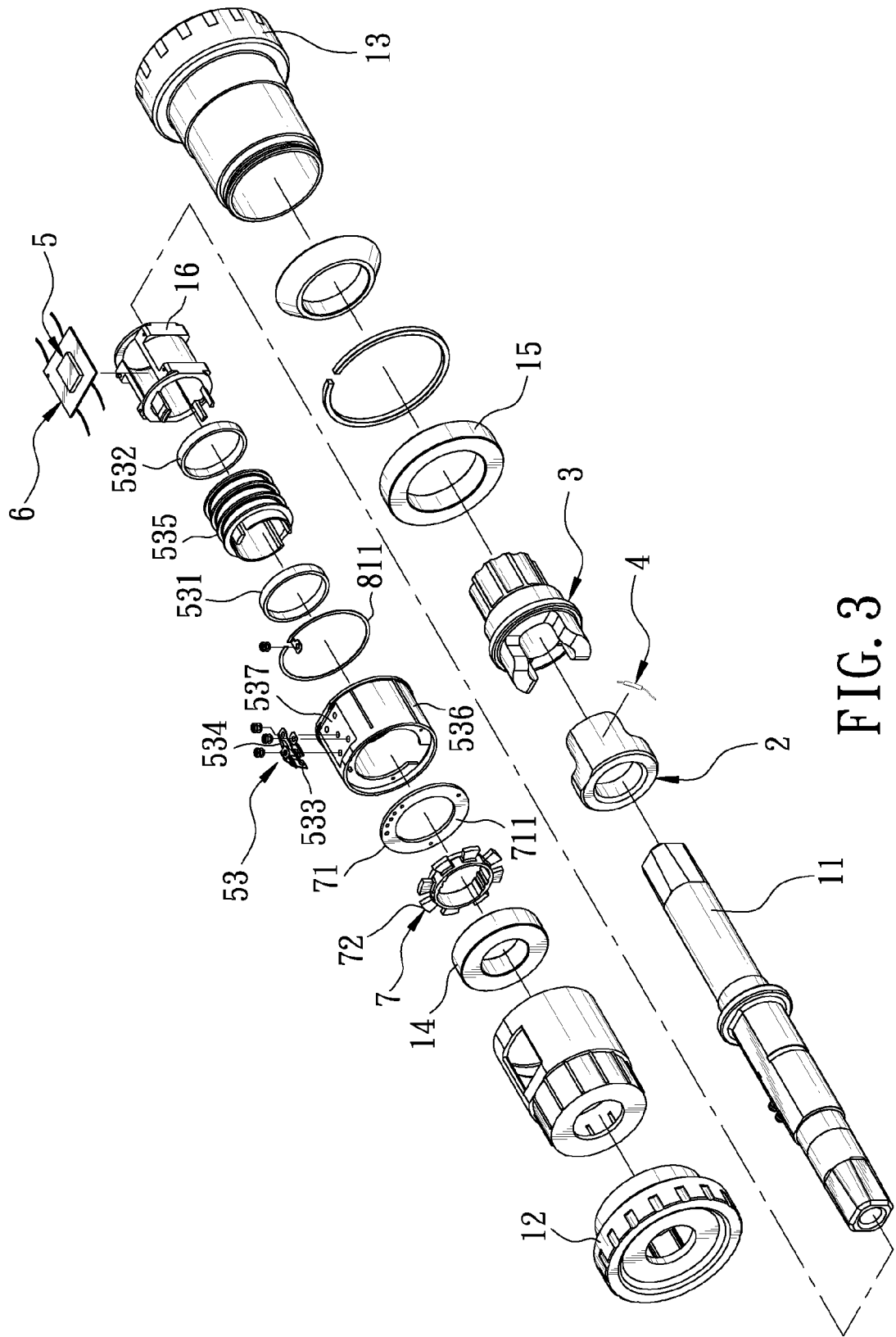
FIG. 3 is an exploded perspective view of the preferred embodiment.

Referring to FIGS. 1, 2, and 3, the preferred embodiment of the assisting force control device according to this invention is for use in a bicycle. The bicycle includes a crankshaft 11, a first ring 12 and a second ring 13 respectively disposed at two sides of the crankshaft 11, two cranks (not shown) respectively disposed at outer sides of the first ring 12 and the second ring 13, a first bearing 14 and a second bearing 15 respectively disposed in the first ring 12 and the second ring 13, a circuit board mounting base 16 sleeved on the crankshaft 11, and an electric motor (not shown) connected to the bicycle for providing the assisting force thereto.

Figure 4:
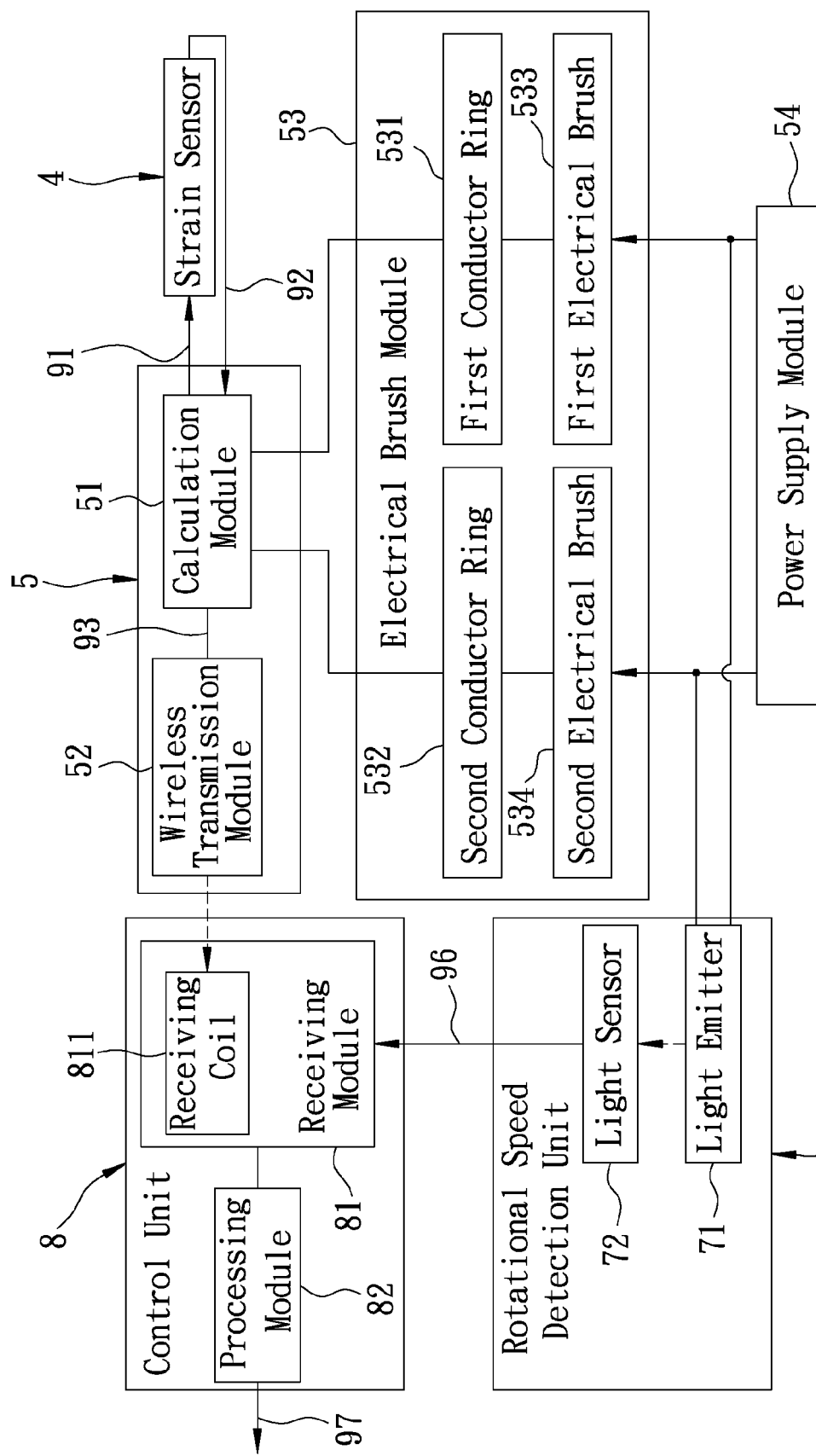
FIG. 4 is a block diagram of the preferred embodiment.

Referring to FIGS. 2, 3, 4, the assisting force control device comprises a driving member 2, a driven member 3, a strain sensor 4, a torque calculation unit 5, a circuit board 6, a rotational speed detection unit 7, a control unit 8, an electrical brush module 53, and a power supply module 54.

The driving member 2 is coupled and sleeved co-rotatably to the crankshaft 11. The driven member 3 is sleeved on the crankshaft 11 and is connected to the driving member 2 for co-rotation therewith. In this embodiment, the driving member 2 and the driven member 3 have two pairs of mating parts that surround the crankshaft 11. When the driving member 2 is co-rotated with the crankshaft 11, the driven member 3 is co-rotated through the mating parts.

The strain sensor 4 is disposed on the driving member 2, and is operable to output a response signal 92 corresponding to a deformation amount of the driving member 2. In this embodiment, the strain sensor 4 is a resistive strain sensor having one end for receiving an initial signal 91 and another end for outputting the response signal 92.

The torque calculation unit 5 is coupled to the strain sensor 4 for calculating and outputting a torque signal 93 according to the response signal 92, and includes: a calculation module 51 coupled to the strain sensor 4, and operable to calculate and to output the torque signal 93 according to the response signal 92; and a wireless transmission module 52 coupled to the calculation module 51 for wireless transmission of the torque signal 93. In this embodiment, the torque signal 93 transmitted by the wireless transmission module 52 is a wireless radio frequency signal.

The power supply module 54 in this embodiment is a battery, and the electrical brush module 53 is for coupling the power supply module 54 to the torque calculation unit 5. In this embodiment, the electrical brush module 53 includes:

first and second conductor rings 531, 532 disposed spacedly along length of the crankshaft 11 and coupled to the torque calculation unit 5;

a first electrical brush 533 slidably contacting the first conductor ring 531;

a second electrical brush 534 slidably contacting the second conductor ring 532;

an insulator ring 535 sleeved on the crankshaft 11, the first and second conductor rings 531, 532 being disposed on the insulator ring 535;

a sleeve 536 disposed to surround the first and second conductor rings 531, 532; and an installation base 537 disposed on the sleeve 536 and through which the first and second electrical brushes 533, 534 extend.

The power supply module 54 is coupled to the first and second electrical brushes 533, 534 of the electrical brush module 53 for providing electrical power to the calculation module 51 via the first and second electrical brushes 533, 534, and the first and second conductor rings 531, 532. The calculation module 51 thereby provides the initial signal 91 to the strain sensor 4 for enabling the latter to sense the deformation amount of the driving member 2.

The circuit board 6 is disposed on the crankshaft 11 and is mounted on the circuit board mounting base 16. The torque calculation unit 5 is disposed on the circuit board 6.

The rotational speed detection unit 7 is mounted on the crankshaft 11 and is operable to output a rotational speed detecting signal 96 based on a rotational speed of the crankshaft 11.

In this embodiment, the rotational speed detection unit 7 includes a light emitter 71 connected to the crankshaft 11, and a light sensor 72 disposed to surround the crankshaft 11 non-rotatably. The light sensor 72 is operable to output the rotational speed detecting signal 96 in response to receipt of light from the light emitter 71. In this embodiment, when the light emitter 71 is co-rotated with the crankshaft 11, the light sensor 72 is operable to calculate the rotational speed detecting signal 96 in response to receipt of moving light.

In this embodiment, the light emitter 71 includes a ring-shaped board 711 equipped with a plurality of light sources that are operable to emit light within a wavelength range of 800 nm to 950 nm for receipt by the light sensor 72.

The control unit 8 includes a receiving module 81 for receiving the rotational speed detecting signal 96 and the torque signal 93 from the rotational speed detection unit 7 and the torque calculation unit 5, respectively, and a processing module 82 coupled to the receiving module 81 for generating a force control signal 97 to control the electric motor such that the electric motor is able to provide an appropriate assisting force to the bicycle according to the rotational speed detecting signal 96 and the torque signal 93. The receiving module 81 includes a receiving coil 811 for receiving the torque signal 93 in this embodiment.

When a user rides the bicycle equipped with the assisting force control device and rotates the cranks, the crankshaft 11, and the driving member 2, the driven member 3 becomes a load to the driving member 2 to result in slight deformation of the driving member 2. The strain sensor 4 is thus deformed and outputs the response signal 92, which corresponds to the deformation, to the calculation module 51. The calculation module 51 calculates the torque signal 93 that corresponds to the torque experienced by the crankshaft 11 according to the response signal 92, and the torque signal 93 is outputted to the receiving module 81 of the control unit 8 by wireless transmission.

At the same time, the light emitter 71 disposed on the crankshaft 11 is co-rotated, and the light sensor 72 is operable to calculate the rotational speed of the crankshaft 11 from received light emitted from the light emitter 71 with a specific wavelength, and to output the rotational speed detecting signal 96 to the receiving module 81 of the control unit 8. By taking into account the torque signal 93 and the rotational speed detecting signal 96, the probable road condition can be judged (such as uphill, downhill, or flat terrain).

Since the work P produced from user's treading (i.e., the energy dissipation) is proportional to the rotational speed ω and the output force T, the relationship can be described using the following equation:

$$P = \omega T = 2\pi f \cdot T$$

where f represents number of rotations per second.

Since the torque experienced by the crankshaft 11 is proportional to the output force T, the control module 8 is operable to calculate the energy dissipation from the user's treading based the received rotational speed detecting signal 96 and the torque signal 93. Through judging the road condition, the processing module 82 is operable to calculate an optimal force control signal 97 for the electric motor. Compared to the conventional electric bicycle, the present invention makes it possible for the electric motor to provide the force responsive to actual work performed by the user, so as to ease the user's driving load.

To sum up, by measuring deformation from co-rotation of the driving member 2 and the driven member 3, the torque applied on the crankshaft 11 is calculated. With cooperation from the rotational speed measurement by the rotational speed detection unit 7, the force control signal 97 which is precisely responsive to user's applied force is calculated to drive the electric motor, such that the assisting force is adjustable according to actual road and riding conditions.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An assisting force control device adapted for use in a bicycle including an electric motor and a crankshaft, said assisting force control device comprising:
   a driving member to be coupled co-rotatably to the crankshaft;
   a strain sensor disposed on said driving member, and operable to output a response signal corresponding to a deformation amount of said driving member;
   a torque calculation unit coupled to said strain sensor for calculating and outputting a torque signal according to the response signal;
   a rotational speed detection unit to be mounted on the crankshaft and operable to output a rotational speed detecting signal based on a rotational speed of the crankshaft; and
   a control unit including
      a receiving module for receiving the rotational speed detecting signal and the torque signal from said rotational speed detection unit and said torque calculation unit, respectively, and
      a processing module coupled to said receiving module for generating a force control signal to control the electric motor according to the rotational speed detecting signal and the torque signal.

2. The assisting force control device as claimed in claim 1, wherein said driving member is to be sleeved co-rotatably on the crankshaft, and said assisting force control device further comprises a driven member to be sleeved on the crankshaft and connected to said driving member for co-rotation therewith.

3. The assisting force control device as claimed in claim 1, further comprising a circuit board to be disposed on the crankshaft, said torque calculation unit being disposed on said circuit board.

4. The assisting force control device as claimed in claim 3, wherein said torque calculation unit includes:
   a calculation module coupled to said strain sensor, and operable to calculate and to output the torque signal according to the response signal; and
   a wireless transmission module coupled to said calculation module for wireless transmission of the torque signal to said receiving module.

5. The assisting force control device as claimed in claim 4, further comprising a power supply module, and an electrical brush module for coupling said power supply module to said torque calculation unit.

6. The assisting force control device as claimed in claim 5, wherein said electrical brush module includes:
   first and second conductor rings to be disposed spacedly along length of the crankshaft and coupled to said torque calculation unit;
   a first electrical brush slidably contacting said first conductor ring; and
   a second electrical brush slidably contacting said second conductor ring;
   said power supply module being coupled to said first and second electrical brushes of said electrical brush module.

7. The assisting force control device as claimed in claim 6, wherein said electrical brush module further includes an insulator ring to be sleeved on the crankshaft, said first and second conductor rings being disposed on said insulator ring.

8. The assisting force control device as claimed in claim 7, wherein said electrical brush module further includes a sleeve disposed to surround said first and second conductor rings, and an installation base disposed on said sleeve and through which said first and second electrical brushes extend.

9. The assisting force control device as claimed in claim 8, wherein said rotational speed detection unit includes a light emitter to be connected to the crankshaft, and a light sensor to be disposed to surround the crankshaft and coupled to said receiving module, said light sensor being operable to output the rotational speed detecting signal in response to receipt of light from said light transmitter.

10. The assisting force control device as claimed in claim 9, wherein said light emitter includes a ring-shaped board equipped with a plurality of light sources that are operable to emit light within a wavelength range of 800 nm to 950 nm for receipt by said light sensor.

11. The assisting force control device as claimed in claim 1, wherein said rotational speed detection unit includes a light emitter to be connected to the crankshaft, and a light sensor to be disposed to surround the crankshaft and coupled to said receiving module, said light sensor being operable to output the rotational speed detecting signal in response to receipt of light from said light transmitter.

\* \* \* \* \*